Feb. 9, 1960 W. C. TOWNSEND ET AL 2,924,443
AUTOMATIC PIVOTAL WEIGHING SCALE
Filed June 13, 1957
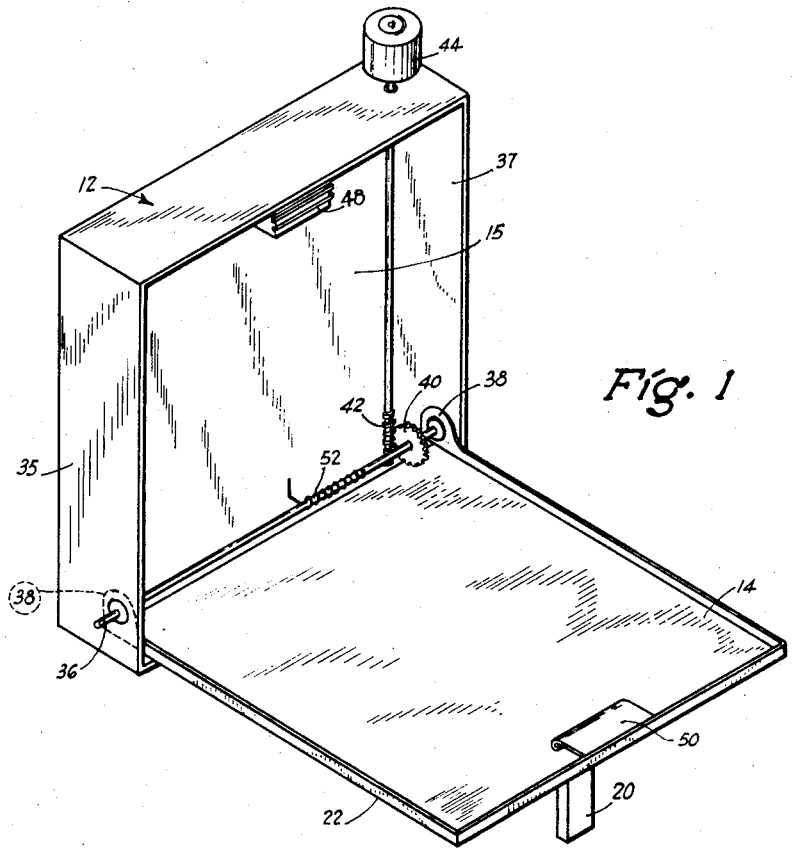
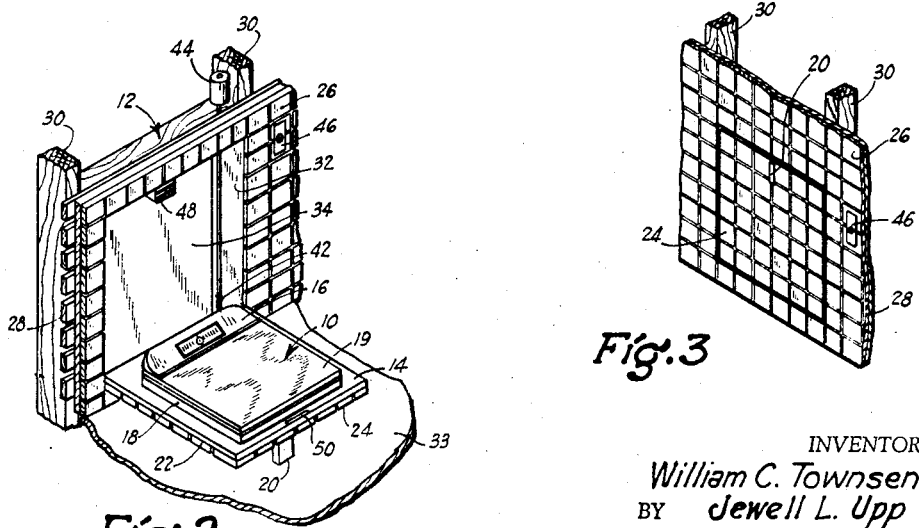
INVENTORS
William C. Townsend
BY Jewell L. Upp
ATTORNEY

2,924,443
AUTOMATIC PIVOTAL WEIGHING SCALE

William C. Townsend and Jewell L. Upp, Tulsa, Okla.

Application June 13, 1957, Serial No. 665,561

1 Claim. (Cl. 265—27)

This invention relates to improvements in weighing scales and more particularly, but not by way of limitation, to a bathroom type scale designed and constructed for pivotal movement into a wall recess during periods of non-usage thereof.

In the contemporary or modern residential architecture and construction of today, the bathroom is often designed with built-in dressing tables, and the like, which utilize a substantial portion of the available wall space in the room. Furthermore, the floor space is usually exposed to traffic with very little or no "out-of-the-way" areas. Thus, with the wall space and floor space at a premium, if a person desires a bathroom type weighing scale, it may be necessary to place the scale on the floor of the room in a position wherein a hazardous condition may result from a person tripping or stumbling thereover.

The present invention contemplates a novel bathroom type scale particularly designed and constructed for pivotal movement into disposition within a wall recess when not in use, thereby substantially avoiding the possibility of accidental stumbling over the scale, such as may be the case when the scale remains on the floor at all times. The novel scale may be readily and easily pivoted to a substantially horizontal position adjacent the bathroom floor when it is desired to use the scale. Furthermore, the lower or back surface of the scale is particularly constructed for receiving any suitable wall finish, such as ceramic tile, linoleum, or the like, to harmonize with the construction of the bathroom wall itself. Thus, when the scale is not in use, it may be disposed within the wall recess wherein it blends with the surrounding wall structure and becomes inconspicuous. The present invention provides a novel bathroom scale which may be utilized with efficiency, and yet may be disposed in an out-of-the-way position when not in use without any detrimental aspect to the appearance of the room.

It is an important object of this invention to provide a novel bathroom type weighing scale particularly designed and constructed to conserve floor space and wall space in a bathroom.

It is another object of this invention to provide a novel bathroom scale which may be disposed within a wall recess during periods of non-usage and readily pivoted to a substantially horizontal position adjacent the floor during usage of the scale.

Still another object of this invention is to provide a novel pivotal bathroom scale having one face thereof designed for receiving a suitable wall construction in order to harmonize with the wall of the room wherein the scale is utilized.

A further object of this invention is to provide a novel pivotal bathroom weighing scale which is simple and efficient in operation and economical and durable in construction.

Other objects and advantages of the invention will be evident from the following detailed description, read in conjunction with the accompanying drawings, which illustrate our invention.

In the drawings:

Figure 1 is a perspective view of the housing for the bathroom scale with the scale mechanism omitted for purposes of illustration.

Figure 2 is a perspective view of the novel pivotal scale in an open or horizontal position for usage.

Figure 3 is a perspective view of the novel scale in a closed position and disposed within the wall recess.

Referring to the drawings in detail, reference character 10 refers in general to a pivotal bathroom type weighing scale comprising a substantially rectangular or square frame member 12 having a flat base member 14 pivotally secured in the proximity of the lower portion thereof. The frame member may be open at both sides thereof or may be provided with one side closed by a back plate member 15 to provide a housing structure, if desired. A suitable scale mechanism 16 having a casing 18 for supporting a standing platform 19 is suitably secured to or integral with the base member, as shown in Fig. 2. The casing 18 is preferably slightly smaller in outside dimensions than the base member 14 in order that the scale 16 may be disposed entirely within the frame or housing member 12 when the base 14 is disposed thereagainst, as shown in Fig. 3. A support or leg member 20 is suitably pivotally secured to the lower or outer surface 22 of the base member 14 for supporting the base 14 in a substantially horizontal position when the scale 16 is in use, as shown in Figs. 1 and 2. The surface 22 of the base 14 is suitably finished in order to receive suitable ceramic tiling 24. It is preferable that the tiling 24 is substantially identical with or harmonizes with the ceramic tiling 26 provided on the wall 28, only a portion of which is shown in the drawings. It will be apparent that the surface 22 of the base 18 may also receive plaster, linoleum, or the like, in lieu of the tiling, in order to complement or assimilate the appearance of the construction of the wall 28, in the event the wall structure is not tile. Furthermore, the entire surface 22 may be chrome plated, or the like, if desired, in order to provide an attractive appliance.

The frame member 12 is preferably of a size to be disposed between a pair of adjacent wall studs 30 and is nailed, or otherwise secured thereto by means of suitable wood screws 32. In this manner, an encased recess 34 is provided in the wall 28. It is preferable to secure the frame member 12 in the proximity of the floor 33. Thus, when the base 14 is pivoted to a horizontal position, the leg member 20 will pivot by gravity to a position substantially perpendicular to the plane of the base 14 and rest on the floor 33 for supporting the base and scale mechanism 16 secured thereto.

The base member 14 is pivotally secured to the frame member 12 by means of a rod member 36 journalled between the upright side members 35 and 37 of the frame. The rod 36 extends throughout the width of the frame member 12 and extends through a pair of opposed upwardly extending flange members 38 (Fig. 1) provided on the opposite sides of the base member 14. The rod is rigidly secured to the flanges 28 in any suitable manner, thereby transmitting rotational or pivotal movement to the base 14. A suitable gear member 40 is rigidly secured to the rod 36 and is spaced slightly from one of the flange members 38. The gear 40 is rotated by a worm gear 42 which extends upwardly in a perpendicular direction from the rod 36 and into connection with a suitable electric motor 44, which is shown in Fig. 1 disposed on the top of the frame member 12. One direction of rotation of the worm gear 42 rotates the gear 40 in a counterclockwise direction, as viewed in Fig. 1, while the opposite direction of rotation of the worm gear 42 will rotate the gear 40 in a clockwise direction. The rotation of the gear 40 is transmitted to the base 14 through the rod 36.

It will be apparent that the motor 44 may be disposed adjacent the bottom of the frame 12 or within the casing 18, if desired, instead of at the top thereof as depicted in the drawings for facilitating maintenance thereof. The motor 44 is preferably an electric motor having an automatic cut-off switch (not shown) built integral therewith for purposes as will be hereinafter set forth. The motor 44 is operated or energized by means of a spring return switch 46 (Fig. 2) which may be mounted on the wall 28 adjacent or in the proximity of the scale 10 and electrically connected with the motor 44 in any suitable manner (not shown). The switch 46 is preferably suitably marked or indicated with an "up" position, a "down" position, and a neutral or "off" position. When the switch 46 is manually held in the "up" position, the motor 44 is electrically energized for rotating the base member 14 in a counterclockwise or "up" direction into a position adjacent the frame 12. When the switch 46 is manually held in the "down" position, the motor 44 is electrically energized for rotating the base member 14 in a clockwise or "down" direction to a horizontal position spaced slightly above the floor 33. When the manual pressure on the switch 46 is released, the spring return thereof automatically moves the switch to the "off" or neutral position. As hereinbefore set forth, the motor 44 is preferably provided with automatic cut-off switches integral therewith in order that the motor will cease to operate when the base member 14 has reached the full "up" or full "down" position, thereby avoiding any possibility of burning out the motor during the operation of the scale 10.

A pair of cooperating magnet members 48 and 50 are provided on the frame 12 and base 14 for holding the base member adjacent the frame when the base member is in a full "up" position and the scale 10 is not in use. It will be apparent that any other suitable type latching means may be provided in lieu of the cooperating magnets. A torsion spring 52 is provided around the rod 36 and has one end anchored to the frame 12 and the other end anchored to the rod in any suitable manner. The torsion spring 52 constantly urges the base member 14 upwardly toward a closed position against the frame 12 to assist the motor 44 in moving the base 14 upwardly against the pull of gravity. Thus, the motor 44 must overcome the action of the spring 52 in order to lower the base member 14 to the horizontal position, thereby easing the base 14 downwardly and preventing a slamming action thereof. The weight of the scale mechanism 16 and the base 14 will maintain the base in the horizontal position until the motor 44 is actuated for pivoting the base upwardly into the closed position adjacent the frame 12.

*Operation*

When it is desired to use the bathroom weighing scale 10, the switch 46 is manually moved and held in the "down" position, as herein before set forth, for starting the motor 44. When the switch 46 is in the "down" position, the motor 44 operates to turn the worm gear 42 in a direction for rotating the gear 40 in a clockwise direction, as viewed in Fig. 1. The gear 40 is rigidly secured to the rod 36, and thus, the rod turns simultaneously therewith. The rotation of the rod 36 is transmitted to the base 14 through the flange members 38. Thus, the base member 14 will be pivoted outwardly from the frame member 12 in a clockwise direction and toward a horizontal position adjacent to or spaced slightly above the floor 33. The leg member 20 will pivot due to gravity as the base member 14 moves downwardly, and the leg will rest on the floor 33 for supporting the base 14 and the scale mechanism 16 in the horizontal position. The person using the scale 10 for weighing may then stand on the platform 19 and read his weight from the scale mechanism 16, as is well known.

When the scale 10 is not in use, the switch 46 may be manually moved to the "up" position, wherein the operation of the motor 44 is reversed to rotate the worm gear 42 in an opposite direction for moving the base member 14 upwardly or in a counterclockwise direction toward a closed position adjacent the frame member 12. As hereinbefore set forth, the switch 46 must be manually retained in the "up" position until the base member has reach a full closed position against the frame member 12, at which time the motor 44 will automatically cease to operate. The manual pressure on the switch 46 may then be released, whereupon the switch will return to the "off" or neutral position due to the spring return action of the switch.

The scale mechanism 16, including the casing 18 and platform 19, will be disposed entirely within the wall recess 34, and will thus be out of sight and stored out of the way to preclude accidental stumbling over the scale. The tiling 24 on the outer surface 22 of the base 14 will be flush with the tiling 26 of the wall 28 when the base 14 is in a full closed position adjacent the frame 12 and thereby become inconspicuous. The leg 20 will pivot by gravity into a position snug against the surface 22 of the base 14 when the base is in a closed position, as shown in Fig. 3. It will be apparent that a recess (not shown) may be provided in the tiling 24 in order to receive the leg 20 therein when the scale 10 is in the closed or stored position.

It will be apparent that the scale 10 may be mounted in the side wall of a dressing table (not shown), or the like, in a similar manner as shown herein. Thus, the scale 10 may provide for utilization of space which is often wasted.

From the foregoing, it will be apparent that the present invention provides a novel pivotal bathroom type weighing scale which may be readily moved to a horizontal position adjacent the floor when it is desired to use the scale. The scale may be quickly and easily moved to a stored position within a wall recess when the scale is not in use, thereby conserving floor space and wall space. The novel scale mechanism is simple and efficient in operation and durable and economical in construction.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

A weighing scale comprising a housing member, a base member pivotally secured to the housing member, a scale mechanism rigidly secured to the base member, means for pivoting the base member to alternate positions of open and closed with respect to the housing member, said means comprising a motor mounted on the housing member, a worm gear secured to the motor for rotation thereby, a rod member journalled in the housing member and rigidly secured to the base member, a gear member rigidly secured to the rod member and disposed adjacent the worm gear for rotation thereof to transmit rotation to the rod member, said rod member transmitting rotation to the base member, means cooperating between the housing and base member for retaining the base member in a closed position, support means provided on the base member for supporting the base in an open position therefor, said scale mechanism disposed within the housing member in a closed position for the base, and said scale member disposed substantially horizontally in an open position for the base.

References Cited in the file of this patent

UNITED STATES PATENTS

| | | |
|---|---|---|
| 1,230,740 | McCracken | June 19, 1917 |
| 1,887,986 | Baldwin | Nov. 15, 1932 |
| 2,561,358 | Gipple | June 24, 1951 |
| 2,656,236 | Wasemann | Oct. 20, 1953 |